ered July 18, 1916.# UNITED STATES PATENT OFFICE.

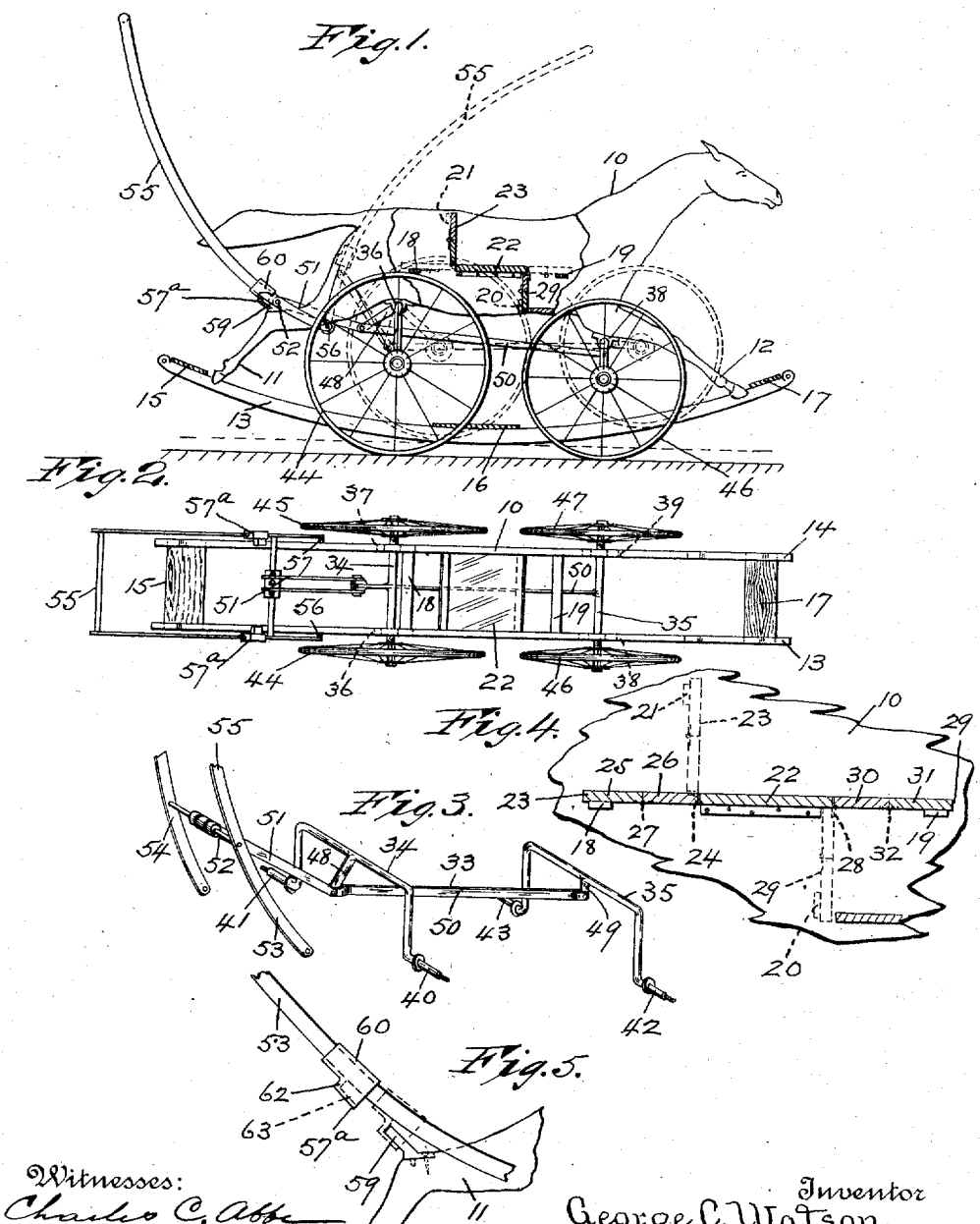
G. C. WATSON.
CONVERTIBLE VEHICLE.
APPLICATION FILED JULY 28, 1913.
1,191,252.
Patented July 18, 1916.
2 SHEETS—SHEET 1.
Witnesses:
Charles C. Abbe
M. Carmody
Inventor
George C. Watson.
By his Attorney
W. T. Criswell.

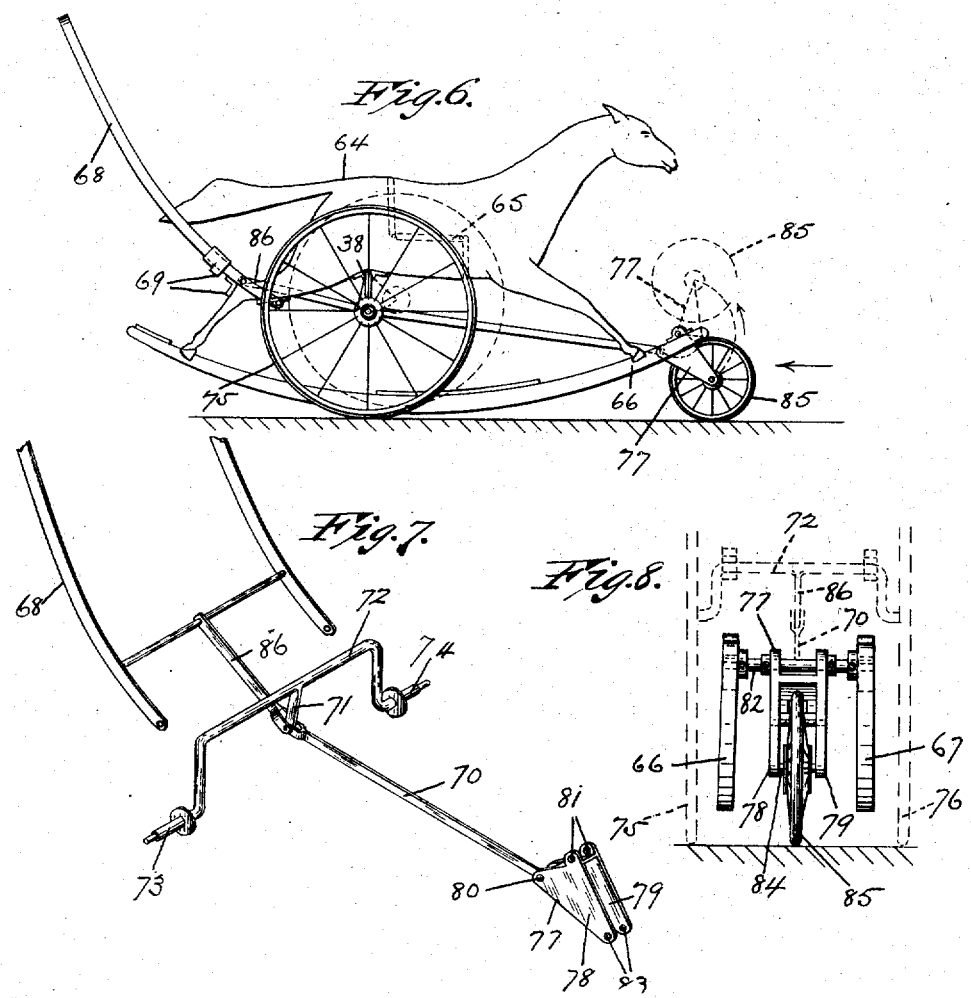

GEORGE C. WATSON, OF NEW YORK, N. Y., ASSIGNOR OF ONE-HALF TO ISRAEL STEIN, OF NEW YORK, N. Y.

CONVERTIBLE VEHICLE.

1,191,252.   Specification of Letters Patent.   Patented July 18, 1916.

Application filed July 28, 1913. Serial No. 781,648.

*To all whom it may concern:*

Be it known that I, GEORGE C. WATSON, a citizen of the United States, and a resident of New York, county and State of New York, have invented a certain new and useful Improvement in Convertible Vehicles, of which the following is a full, clear, and exact specification.

This invention relates to a class of vehicles adapted for the use of children.

My invention has for its object primarily to provide a vehicle designed to be employed to afford comfort and pleasure to infants and children, and which is of a form adapted to be readily converted from a vehicle to a rocker, or vice versa as occasion requires, whereby the infant or child may be wheeled from place to place, or if preferred the occupant may be amused by being conveniently rocked; and another object of the invention is to provide a form of convertible vehicle wherein its body may be made to represent one or more animals, or made in other fanciful shapes.

Still another object of the invention is to provide means which serves to permit the axles of the vehicle to be moved for shifting the wheels so as to be clear of the surface of the ground for converting the vehicle to a rocker; and a further object of the invention is to provide an adjustable seat which may be arranged in the form of a chair, or a bed as occasion requires.

With these and other objects in view, the invention will be hereinafter more particularly described with reference to the accompanying drawings, which form a part of this specification, and will then be pointed out in the claims at the end of the description.

In the drawings, Figure 1 is a side elevation, partly in section, of one form of convertible vehicle embodying my invention. Fig. 2 is a top plan of the vehicle. Fig. 3 is a perspective view, partly fragmentary, of the running gear of the vehicle. Fig. 4 is an enlarged fragmentary view showing in section the adjustable seat employed in the vehicle. Fig. 5 is an enlarged fragmentary view, showing one of the locking elements used in the vehicle. Fig. 6 is a side elevation of a somewhat different form of the vehicle. Fig. 7 is a perspective view, partly fragmentary, of the running gear of the vehicle shown in Fig. 6, and Fig. 8 is a fragmentary view, partly in detail of the front end of the vehicle illustrated in Fig. 6.

The vehicle has a body 10 which is preferably made in a form representing two spaced animals, or said body may be in the form of a single animal having a hollow body portion with an open top, or any other suitable type of body may be used. When the body 10 of the vehicle is of the shape of one, or more animals the legs thereof serve as standards 11 and 12. To the lower ends of the standards 11 and 12 are connected spaced curved runners 13 and 14 for permitting the vehicle to be used as a rocker, and the said runners are connected by cross-plates 15, 16, 17. Transversely of the central part of the interior of the body 10 are two spaced bars 18 and 19. In the lower part of the body 10 is a transverse bar 20, and in the upper part of said body is another transverse bar 21. Midway between the bars 18 and 19 is provided an adjustable seat 22. The seat 22 has a back 23 which is hinged, at 24, to the rear edge thereof, and said back is composed of two transverse sections 25 and 26 which are pivoted together, at 27. To the front edge of the seat 20 is hinged, at 28, a footboard 29 also composed of two sections 30 and 31 which are pivoted together, at 32. When the seat 22 is used for supporting the occupant in a sitting posture the section of the back 23 and the sections of the footboard 29 are moved toward folded positions and then unfolded so as to be vertically positioned against the upper and lower transverse bars 20 and 21, respectively. When the occupant is in a reclining position the back is adjusted to rest upon the bar 18, and the footboard is directed so as to rest upon the bar 19, as shown in Fig. 4.

The vehicle has a running gear, as 33, composed of a rear axle 34 and a front axle 35. Each of the axles 34 and 35 is substantially the shape of an inverted U. The cross-arm of the axle 34 is pivotally connected to the body 10 of the vehicle by being guided through two bearings, or apertured lugs 36 and 37 which are provided upon the underside of the rear part of said body, and the cross-arm of the axle 35 is pivotally fastened to the body by being disposed through two bearings, or orificed lugs 38 and 39 which are attached upon the underside of the front part of said body. Extending on alinement in opposite lateral directions from the free end of the rear axle 34 are hubs 40 and 41, and extending on alinement in opposite lateral directions from the free end of the front axle 35 are hubs 42 and 43. Revoluble upon each of the hubs 40, 41, 42, 43 is a wheel, as 44, 45, 46, 47, all of which may be of any well known makes. Projecting on an incline downwardly from the central part of the rear axle 34 is a rod 48, and projecting vertically downwardly from the central part of the front axle 35 is a rod 49 which is somewhat shorter than said inclined rod. To the rod 49 is pivoted one end of a longitudinally disposed bar 50, and the opposite end of said bar is pivoted to the inclined rod 48. Also pivoted to both the inclined rod 48 and to the longitudinal bar 50 is a lever 51 having its other end pivotally held to a cross-rod 52 provided between the spaced side arms 53 and 54 of a handle 55 adapted to be used for manually wheeling the vehicle. The lower ends of the side arms of the handle 55 are pivoted, at 56 and 57, to the underside of the body of the vehicle so that when the handle is swung in a direction over and upon the body the lever 51 will also be moved upwardly therewith, as indicated in dotted lines Fig. 1. The inclined rod 48 will thereby be forced in a forward direction for moving the longitudinal bar 50 and swinging the vertical rod 49 in directions toward the front of the vehicle. The wheels of the vehicle will be elevated from the surface of the ground to a distance for permitting the runners 13 and 14 to rest upon the ground, and the vehicle may then be used as a rocker.

Serving to permit the handle 55 to be rigidly held when the vehicle is wheeled upon corresponding opposite parts of the rear portion of the body 10 is provided two locking elements, as 57ª, each composed of two projecting lugs 59 one secured to each of the standards 11 of the body. Upon the side arms 53 and 54 of the handle is a slidable sleeve 60 having an extension 62 upon its underside, and in each of said extensions is a recess 63. By moving the sleeves 60 upon the handle 55 so that the lugs 59 will be received in the recesses 63 of the extensions of said sleeves the handle will be rigidly held to the body 10, or said handle may be released from its connection to the lugs 59 by reversing the movement of the sleeves thereon.

In Figs. 6, 7, 8 are illustrated views of a form of convertible vehicles wherein is employed three wheels instead of four wheels. This type of the vehicle has a body 64, a seat 65, rocker runners 66, 67, a handle 68, and means, as 69, for locking the handle to the body, all of which are similar in formation to the corresponding parts of the vehicle shown in Figs. 1, 2, 3, 4, 5, as hereinbefore described. For the purpose of permitting three wheels to be employed in the vehicle, I provide a running gear having a longitudinally disposed bar 70. To the rear end of the bar 70 is pivoted a rod 71 which extends on an incline from the central part of a rear axle 72 which is approximately the shape of an inverted U. At the free ends of the vertical arms of the axle 72 are hubs 73 and 74 which extend on alinement in opposite lateral directions, and revoluble on said hubs are two rear wheels 75 and 76 of any well-known makes. Pivoted to the opposite end of the bar 70 is a swinging link, as 77, composed of two similar triangular plates 78 and 79 which are spaced in parallel arrangement. The bar 70 is pivoted at 80, between one of the corresponding corners of the plates 78 and 79, and in apertures 81 provided in another corresponding corner of said plates is held an axle 82 which is journaled in bearings provided upon the front parts of the rocker runners of the vehicle. As shown, the link 77 will thereby be normally disposed on an incline between the rocker runners. Held in apertures 83 in the third corner of the plates of said link is a shaft 84, and upon said shaft is a revoluble wheel 85. Also pivotally held to the rear end of the bar 70 is one end of a lever 86 having its other end pivoted to the handle of the vehicle, whereby this form of the vehicle may be converted to a rocker by moving the handle, as shown in Fig. 1 of the drawing, in a direction over and upon the body of the vehicle. The inclined rod 71 of the rear axle and the bar 70 will be moved for rotatably swinging the rear axle and the link 77 so as to move the wheels free from the surfaces of the ground in a manner similar to operating the form of vehicle having four wheels.

In the foregoing description, I have embodied the preferred form of my invention, but I do not wish to be understood as limiting myself thereto, as I am aware that modifications may be made therein without departing from the principle, or sacrificing any of the advantages of this invention; therefore I reserve to myself the right to make such changes as fairly fall within the scope of the appended claims.

Having thus described my invention, I claim as new and desire to secure by Letters Patent:—

1. In a convertible vehicle, in combination, a hollow body, rocker runners provided upon the body, two axles pivotally held underneath the body, and having wheels mounted thereon, arms for the axles, a bar pivotally connected to the arms at the free ends thereof, a handle pivoted to the body and adapted to swing over, or in the rear thereof, a lever connecting the handle and the bar, said lever serving to direct the bar to swing the axles for moving the wheels free from the surface of the ground, or reversely moving the wheels when the handle is manually moved in a direction toward or from the body of the vehicle so that the vehicle may be alternately wheeled, or used as a rocker, and slidable means coöperative with the body and handle for locking the handle to the body against movement when the wheels are adjusted upon the ground for permitting the vehicle to be wheeled.

2. In a convertible vehicle, in combination, a hollow body, rocker runners provided upon the body, two axles pivotally held underneath the body and having wheels mounted thereon, extensions on said axles, a bar pivotally connected to the extensions of said axles, a U-shaped handle movably connected to the body to move above or in the rear of the same, a lever connecting the handle and the bar, said lever serving to direct the bar to swing the axles for moving the wheels free from the surface of the ground, or reversely moving the wheels when the handle is manually moved in a direction toward or from the body of the vehicle so that the vehicle may be alternately wheeled, or used as a rocker, a lug projecting from the body, a sleeve slidable upon the handle, and adapted to be moved to engage the lug for locking the handle to the body against movement when the wheels are adjusted on the ground for permitting the vehicle to be wheeled.

This specification signed and witnessed this twenty-sixth day of July A. D. 1913.

GEORGE C. WATSON.

Witnesses:
 ROBT. B. ABBOTT,
 I. STEIN.

Copies of this patent may be obtained for five cents each, by addressing the "Commissioner of Patents, Washington, D. C."